Patented Aug. 31, 1937

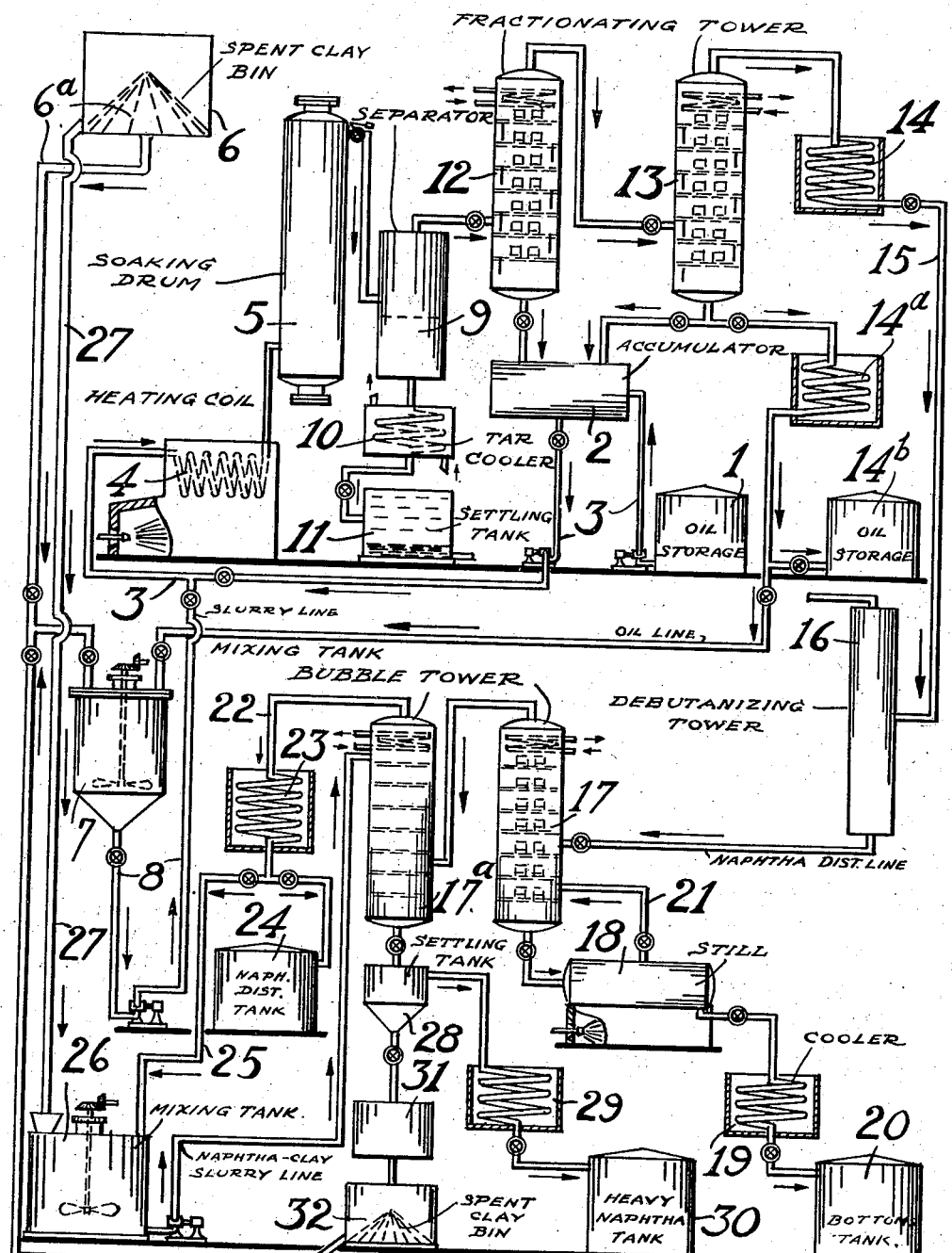

2,091,892

UNITED STATES PATENT OFFICE 2,091,892

TREATING OILS IN THE PRESENCE OF CLAY

Reginald K. Stratford, Sarnia, Ontario, Canada, assignor to Standard Oil Development Company, a corporation of Delaware Application February 21, 1935, Serial No. 7,527

2 Claims. (Cl. 196—55)

This invention relates to a method of utilizing spent clay used in the treatment of lubricating oil stocks, for the purpose of improving the cracking of mineral oils, and will be understood from the following description when read in conjunction with the drawing, the sole figure of which is a diagrammatic side elevation partly in section of the apparatus appropriate for carrying out the invention.

One object of the invention is the utilization of the spent clay used in the treatment of lubricating oils together with the so-called soakage oil which it contains.

Another object is to promote the cracking of mineral oils by the use of the spent clay and to obtain a higher octane number gasoline than is usually obtained at the given temperature of cracking.

A third object of the invention is to improve the color stability of the cracked naphtha by using spent clay from lubricating oil treatment in the fractionating tower of the rerun still, and further, applying the clay which has been used in said tower to the promotion of cracking to produce a cracked naphtha. In this way a color stable cracked naphtha is obtained with a high octane number without acid treatment.

The mineral oil used for cracking may be a petroleum oil, a shale oil, an oil produced by hydrogenating coals, etc. Further, the petroleum oil may be a gas oil, a reduced crude, a heavy naphtha or any other appropriate cut or residual product which is used as cracking stock.

The raw material which is used for cracking may be directly admixed with the clay or it may be first freed from tarry and asphaltic material in the cracking unit itself so as to produce a so-called clean charging stock which is then admixed with the spent clay. It will be, therefore, apparent that the present invention may be carried out in a number of modifications, some of which will be described in more detail hereinafter.

The spent clay is obtained from the treatment of lubricating oil stocks. This treatment may be carried out by various methods, such as the percolation method in which the lubricating oil stock is filtered through a thick layer of coarse clay, or by the contact filtration method in which the lubricating oil stock is admixed and heated to decolorizing temperature with finely divided clay; then the clay is separated by filter pressing, or by the so-called contact reduction method in which the oil is admixed with finely divided clay, heated to a distillation temperature, distilled, and the clay separated from the residual lubricating oil. In all these modifications, either natural clay such as fuller's earth or so-called acid treated clay such as "filtrol" is used. The term "clay" as used in the specification and claims is intended to include any such adsorbent clay, natural or treated, which is used in the decolorization treatment of lubricating oils. For our purposes it is preferable to use the finely divided spent clay from a contact filtration or contact reduction process. In all cases the spent clay contains an appreciable amount of lubricating oil stock with so-called soakage oil, which is a good raw material for cracking and will be thus utilized when the spent clay is added to the cracking stock.

In the preferred method of my process, however, I do not add the spent clay directly to the cracking stock, but I introduce the same into the tower of the rerun still, in which the cracked naphtha is redistilled to obtain a finished gasoline. The spent clay has the effect of stabilizing the color of the naphtha. After passing through the tower the spent clay is admixed with the charging stock and passed through the cracking system in admixture with the oil.

Any of the known cracking methods may be used including the method in which all the cracking is carried out in the heating and cracking coil and the so-called tube and tank method in which the cracking is carried out by passing the charge through the heating coil into an enlarged reaction drum, the so-called soaking drum. The pressure may be atmospheric or higher. Usually it is preferable to operate my process under a pressure of several hundred pounds per square inch. The temperature at which the cracking is carried out may vary, say from about 750° F. to 1000° F., although higher cracking temperatures may also be used. In carrying out my process the cracked oil and the admixed clay are usually passed into a so-called separator in which the tar is obtained as a liquid residual product while the naphtha and the gas oil are passed as an overhead vapor product into a fractionating zone in which the gas oil is separated from the naphtha. This gas oil is usually returned to the cracking as cycle stock. The liquid tar contains most of the clay in suspension. This tar is cooled to a temperature below its flash point and then left to settle, whereby the clay is separated from the tar proper. Usually there is some coke formed in the reaction chamber. This coke will also contain clay.

Referring now to the figure, the same will be described in conjunction with the method of operating the apparatus. The oil to be cracked such as gas oil is charged from the storage tank 1 to the accumulator 2 and thence through line 3 and heating coil 4 to the soaking drum 5. Spent clay obtained in treating lubricating oil stock is passed from bin 6 by means of line 6a into the mixing tank 7 into which a certain amount of a cycle stock is also discharged, as will be described hereinafter. From the mixing tank 7 the slurry of oil and clay is discharged through line 8 into line 3 where it meets the oil from the accumulator 2. The oil and clay pass through the cracking system as described above. From the soaking drum 5 the oil and clay slurry together with the vapors and gases are discharged into the separator 9 from which the tar and the spent clay are removed through the bottom line and cooler 10 into the settling tank 11. From the latter, the oil and the clay are separately removed to points of disposal (not shown). The vapors and gases from the separator are passed through the overhead vapor line into a first fractionating tower 12 and the vapors from the latter into a second fractionating tower 13. Fractionating means such as bell cap plates and reflux lines are provided in these towers together with cooling coils in their upper part. The vapors leaving tower 13 consist of naphtha mixed with non-condensable gases and are cooled in cooler 14, and the naphtha distillate is then discharged through line 15 into the debutanizing tower 16. The condensate from towers 12 and 13 consists of cycle stock and may be discharged directly into the accumulator. All or part of the condensate from tower 13 may be removed through cooling coil 14a and passed into storage tank 14b to be used as heating oil. Part of this condensate may be used for preparing the clay slurry in mixing tank 7. The naphtha distillate passes through the debutanizing tower 16 into the bubble tower 17, the bottom part of which is connected with a still 18 for the purpose of heating, and vaporization. The bottoms from this still is removed through cooler 19 into the storage tank 20. The still 18 is in vapor connection with the bubble tower 17 by means of line 21. The vapors rising from the bubble tower 17 are passed into the lower part of the clay tower 17a from which latter the vapors are removed through line 22, condensed in condenser 23 and passed into storage tank 24 as a stable naphtha distillate. Part of this naphtha distillate is discharged through line 25 into the mixing tank 26 into which spent clay from bin 6 is also charged through line 27. The naphtha-clay slurry from mixing tank 26 is then discharged to the upper part of the clay treating tower 17a to flow in counter-current with the vapors coming from bubble tower 17. The naphtha-clay slurry from tower 17a is passed into the settling tank 28 from which the heavy naphtha is removed through cooler 29 into the storage tank 30. The spent clay is discharged into container 31 and thence to bin 32, from which it is finally charged through line 33 to the mixing tank 7.

The following example will illustrate my invention. A 31.0° A. P. I. Mid-Continent gas oil was submitted to cracking in a tube and tank unit with return of the cycle stock to the cracking. In one case the cracking was carried out as usual and in the other case 1.79# of clay per barrel of fresh feed was added. The conditions of the cracking were identical in the two cases, namely, coil outlet temperature 384° F., pressure on the soaking drum 800# per square inch, the hot effluent from the coil being introduced into the bottom of the soaking drum and taken off at the top thereof with the release of pressure. Due to the recirculation of the cycle stock the percentage of the fresh feed in the total feed was 50.3%. The following results were obtained:

|  | Oil plus clay | Oil alone |
|---|---|---|
| 400 end point distillate, percent by volume | 49.4 | 52.2 |
| Furnace fuel, percent by volume | 10.61 | 11.85 |
| Tar, percent by volume | 32.9 | 30.1 |
| Dry gas, cubic feet per barrel | 10.85 | 8.2 |
| Coke, percent by weight | 0.44 | 0.39 |
| Distillate octane No. C. F. R. M | 64.5 | 59.5 |
| Percent B. S. in tar | 0.37 | 0.56 |
| Percent B. S. by extraction | 0.004 | 0.060 |

These results lead to the conclusion that the effect of the clay is a catalytic promotion of the cracking and is somewhat similar to an increase in the cracking temperature. It appears, however, that the use of spent clay produces a higher octane number gasoline than would be expected for an increase in coil outlet temperature to give similar yields. During the experiment with clay 10% of the same was removed in the coke and the balance in the tar. The clay settled out of the tar very rapidly and completely.

Since my invention may be carried out in a great number of variations, the same is not to be limited by the example given for illustration but only by the following claims, in which it is my intention to claim all novelty inherent in the invention.

What I claim is:

1. A process for converting relatively high boiling hydrocarbon oil into lower boiling products including hydrocarbons suitable for use as motor fuel, which comprises admixing a clay previously spent in the decolorization treatment of lubricating oils with a fluid stream of said relatively high boiling oil, passing said mixture through an elongated zone of restricted cross section wherein it is heated to an oil cracking temperature, maintaining the mixture at cracking temperature for a period sufficient to produce the desired conversion of said oil, introducing the cracked products into a separating zone wherein vapors separate from liquid residue, withdrawing said residue from the process and preventing its return to the heating zone, fractionating said vapors to separate a lower boiling fraction including motor fuel constituents and a reflux condensate, subjecting products from said lower boiling fraction while essentially in vapor form to contact with an adsorbent clay previously spent in the decolorization treatment of lubricating oils and thereafter utilizing said clay last mentioned as at least a portion of the clay introduced into the fluid stream of oil prior to its passage through the heating zone.

2. A process for converting relatively high boiling hydrocarbon oil into lower boiling products including hydrocarbons suitable for use as motor fuel which comprises admixing a clay slurry with a fluid stream of said relatively high boiling oil, passing said mixture through an elongated zone of restricted cross section wheren it is heated to an oil cracking temperature, maintaining the mixture at cracking temperature for a period sufficient to produce the desired conversion of said oil, introducing the cracked products into a separating zone wherein vapors separate from liquid residue, withdrawing said residue from the process and preventing its return to the heating zone, fractionating said vapors to separate a lower boiling fraction including motor fuel constituents and a reflux condensate suitable for use as clean cracking stock, subjecting products from said lower boiling fraction while essentially in vapor form to contact with a slurry of hydrocarbon oil and adsorbent clay previously spent in the decolorization treatment of lubricating oils, separating said adsorbent clay from the treated low boiling products, admixing said separated clay with at least a portion of said reflux condensate to produce a second slurry and using slurry thus obtained as at least a portion of the slurry which is introduced into the fluid stream of oil prior to its passage through the heating zone.

REGINALD K. STRATFORD.